Figure 1:
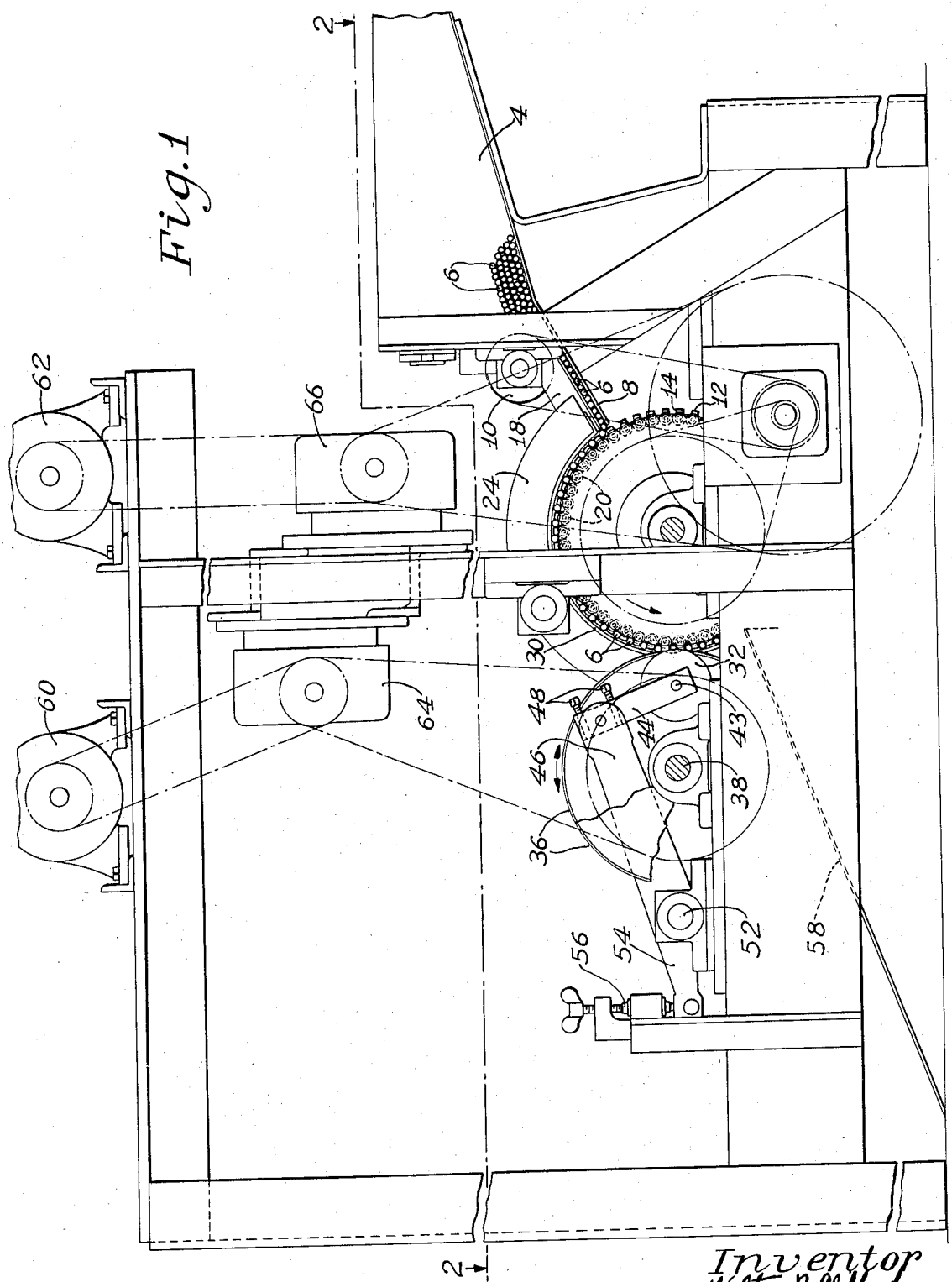

June 15, 1943.   W. B. CLIFFORD   2,321,735
METHOD AND MACHINE FOR SEVERING TUBES
Filed Jan. 12, 1942   3 Sheets-Sheet 1

Witness
Charles T. Olson

Inventor
Walter B. Clifford
by his attorneys
Fish Hildreth Cary & Kenney

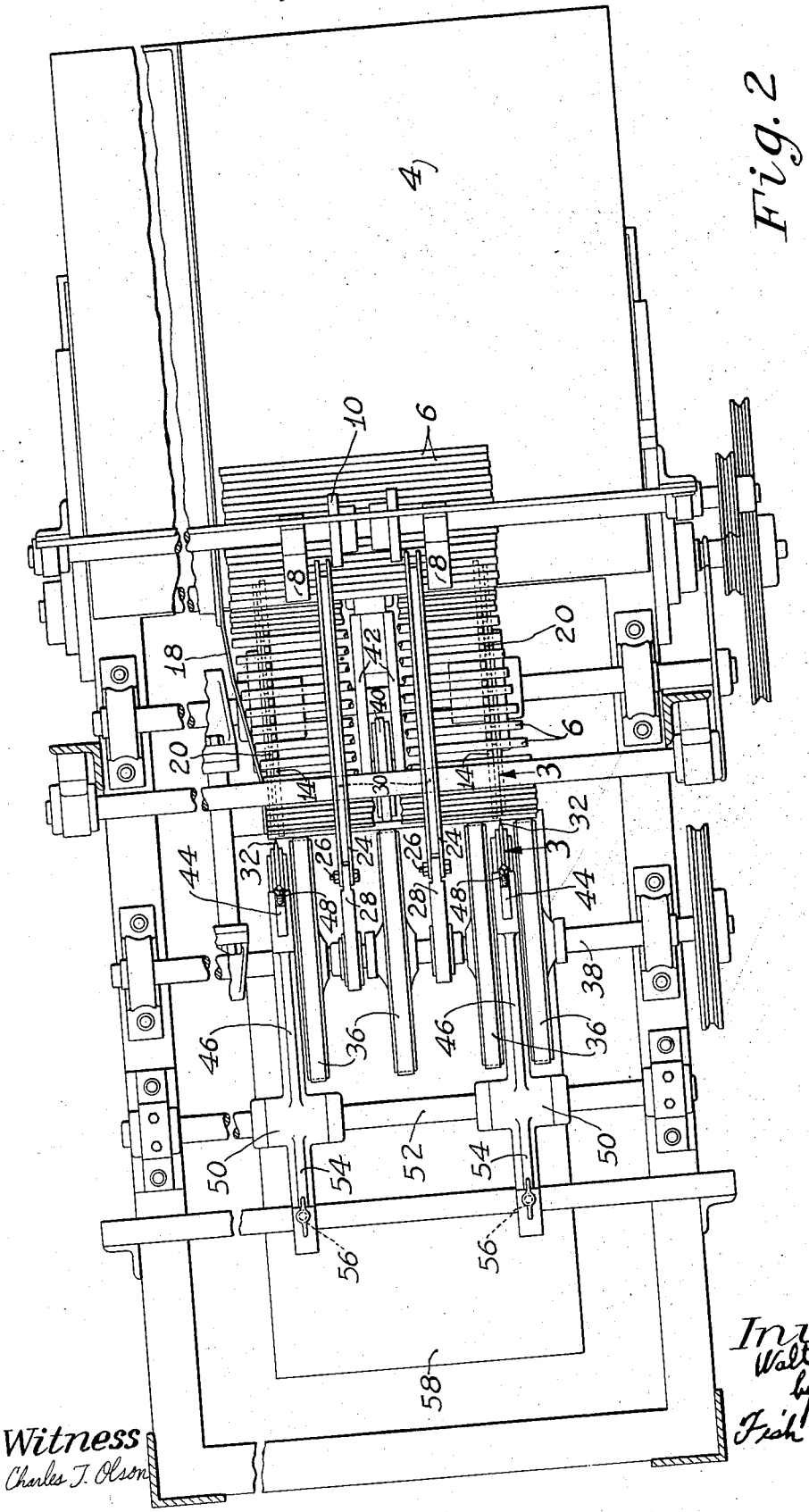

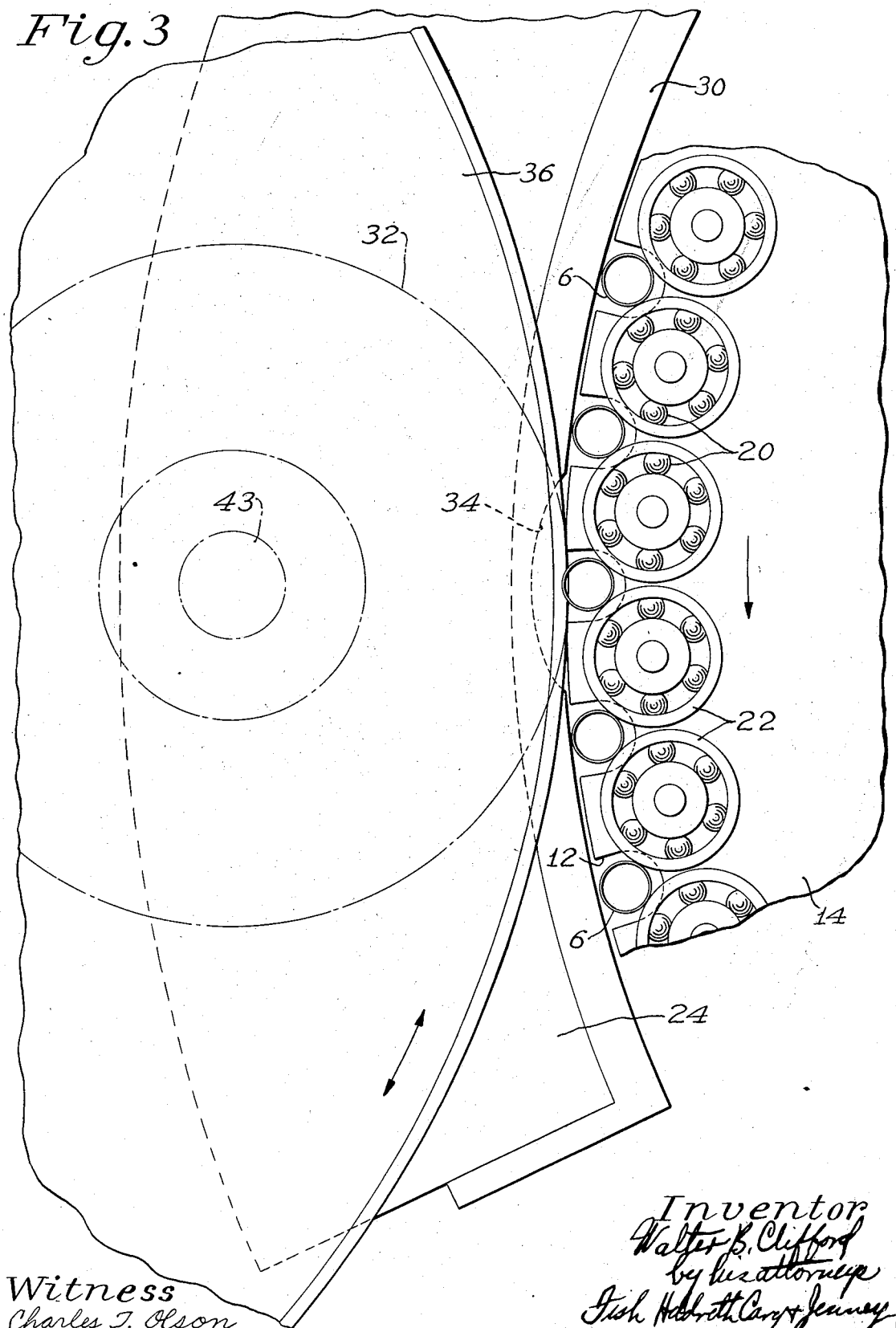

Patented June 15, 1943

2,321,735

UNITED STATES PATENT OFFICE 2,321,735

METHOD AND MACHINE FOR SEVERING TUBES

Walter B. Clifford, Boston, Mass., assignor to Clifford Manufacturing Company, Boston, Mass., a corporation of Delaware Application January 12, 1942, Serial No. 426,378

11 Claims. (Cl. 164—61)

The present invention relates to methods and machines for severing tubes.

Thin-wall tubes (that is, tubes having a wall thickness of about .006″), after manufacture by an extrusion process, must be cut to length for subsequent assembly in heat exchange apparatus. This has been done by sawing, but the sawing method has a number of disadvantages. It is difficult and expensive to maintain the saw sharp and true. Also the tubes frequently exhibit burrs, which may cause difficulty in subsequent operations.

The object of the present invention is to provide a simpler and less expensive method and apparatus for severing thin-wall tubes, and one which will sever the tubes rapidly and without danger of injury thereto.

With this and other objects in view, as will hereinafter appear, the present invention contemplates using a thin cutting disk, which is caused to penetrate only the thin wall of the tube. The tube is rapidly rotated at the time of engagement of the cutting disk therewith.

One important feature is that the disk is rotated at substantially the same peripheral speed as the tube. It has been found that relative movement between the disk and tube is unnecessary to effect the cutting operation, and care is preferably taken to prevent any substantial relative movement, which would result in more rapid wear of the edge of the disk. The tubes severed according to the present invention have edges which are rolled inwardly to a slight extent, and therefore facilitate subsequent assembling operations.

In the accompanying drawings, Fig. 1 is a side elevation with parts broken away of the preferred machine according to the present invention; Fig. 2 is a plan view taken on the line 2—2 of Fig. 1; and Fig. 3 is a section on an enlarged scale taken on the line 3—3 of Fig. 2.

The illustrated embodiment of the invention comprises a hopper 4 to contain a supply of extruded thin-wall tubes indicated at 6. From the hopper, the tubes slide individually down a chute 8. To keep the tubes parallel and to facilitate their individual passage down the chute, a stirring wheel 10 continuously rotates against the tubes that are piled up in the hopper.

The tubes passing down the chute drop into individual notches 12 of spaced feeding wheels 14, which are continuously rotated in a counterclockwise direction as viewed in Fig. 1. In the passage around the wheels, the tubes are laterally positioned by a plate 18 against which the tubes bear at one end.

Each wheel 14 is provided with ball bearings indicated generally at 20. The outer race 22 of each bearing overlaps two adjacent notches 12, as indicated in Fig. 3, whereby tubes 6 fed into the notches are supported on the ball races.

While being fed by the wheels 14, the tubes are held against falling out by means of retainers, indicated at 24. Each retainer comprises a channel member pivotally mounted at 26 on a bracket 28. The inside surface of each retainer is faced with rubber as indicated at 30. If a tube engages the rubber face, it is set into rotation, whereby it is prevented from becoming scarred or bruised. The tubes are successively presented to cutters 32 the operation of which is later to be described in detail. At a point where the tube approaches the cutters, the rubber facing 30 is cut away, as indicated at 34.

As the tube approaches the cutters 32, it is rapidly rotated by means of a series of driving wheels 36 covered with rubber-like material to engage the tubes frictionally. The wheels are mounted on a shaft 38 and are positioned to engage peripheral portions of the tubes with sufficient pressure to rotate the tubes rapidly. The ball bearings 20 facilitate the rotation of the tubes and insure that this operation may be carried out without the necessity of applying excessive pressure to the tubes themselves. It will be noted from Fig. 3 that the start of the rotation is effected just as the tubes are removed from the control of the retainers 24, due to the cut-out portions 34. As shown in Fig. 2, several driving wheels 36 are provided, spaced along the tube.

If the tubes are long, intermediate supports therefor may be necessary, and to this end a wheel 40 is provided and is opposed to one of the central wheels 36. This wheel also has a covering of rubber-like material to engage the tubes. The wheel 40 is mounted on a bracket 42 and is rotated at the same peripheral speed as the tube, perferably by contact with the tube itself.

The cutters 32 engage the tubes immediately adjacent the wheels 14. As shown in Fig. 1, each cutter is mounted on a shaft 43 journaled in a bracket 44. The cutter is rotated at a peripheral speed substantially equal to that of the tubes which it engages, and the preferred method of accomplishing this is to rotate the cutter only by contact with the tubes themselves, that is, without positively driving the shaft 43. The cutting edge is maintained sharp and at a slight bevel, but is smooth, i. e., without saw teeth. The cutter should be accurately mounted to limit the penetration to only the amount necessary for reliable severence of the tube. Some inward rolling of the tube ends is caused by the penetration of the beveled cutter through the tube wall, and such rolling is desirable to facilitate subsequent assembly operations, particularly if the tubes are to be passed through headers or tube sheets, but excessive rolling is to be avoided. This method is distinguished from the customary sawing operation, in which the tubes are necessarily held rigidly against the feed drum and the saws cut all the way through the tube.

To permit accurate adjustment of the cutter, the bracket 44 is pivotally mounted on a swinging bracket 46 and is adjustable with relation to the bracket 46 by means of bolts 48. The bracket 46 is journaled at 50 on a shaft 52. A tail piece 54 on the bracket 46 may be accurately adjusted by means of a wing nut 56. By proper adjustment of the parts 48 and 56, the cutter may be accurately adjusted to the proper height and at the setting for proper penetration of the tubes.

The tube driving wheels 36 may be rotated in either direction, and fast enough to rotate the tubes several hundred revolutions per minute. The cutters 32 are necessarily rotated in the same direction as the wheels 36, since they are driven by engagement with the tubes themselves.

After passing the cutters, the tubes drop out of the feed wheels 14 into a delivery chute 58.

The drives for the parts above described comprise two motors 69 and 62 connected by suitable belting through variable speed mechanisms 64 and 66 to the various shafts described above. The driving connections are not described in detail.

The present invention has been found exceptionally rapid. It is highly satisfactory in that the tubes are severed cleanly, without burrs. The cutters may be used for long periods without sharpening, since the absence of relative movement between cutter and tube diminishes the wear on the cutter. Furthermore, when sharpening is necessary, it is accomplished by a simple grinding operation. It has also been observed that the tubes, which are quite delicate, are handled by the present machine with little or no danger of damage thereto.

Having thus described my invention, I claim:

1. A machine for severing thin-wall tubes comprising a feeding member, anti-friction rotating members carried by the feeding member and arranged to support the tubes, means for rapidly rotating the tubes, a cutter to which the tubes are successively presented, means for mounting the cutter whereby the edge thereof penetrates only the wall of the tube, and means for operating the cutter at substantially the same peripheral speed as the tubes.

2. A machine for severing thin-wall tubes comprising a rotary feeding member, anti-friction rotating members carried by the feeding member and arranged to support the tubes, means for rapidly rotating the tubes, a cutter to which the tubes are successively presented, means for mounting the cutter whereby the edge thereof penetrates only the wall of the tube, and means for operating the cutter at substantially the same peripheral speed as the tubes.

3. A machine for severing thin-wall tubes comprising means for feeding tubes successively, a rotating driving wheel having a surface to frictionally engage and rotate the tubes, and a cutter mounted for free rotation and having an edge to penetrate the tube wall.

4. A machine for severing thin-wall tubes comprising means for feeding tubes successively, a rotating driving wheel having a surface to frictionally engage and rotate the tubes, a cutter mounted for free rotation and having an edge to penetrate the tube wall, and means for driving the cutter so that its edge has substantially the same peripheral speed as tubes being severed.

5. A machine for severing thin-wall tubes comprising a feeding member, anti-friction rotating members carried by the feeding member and arranged to support the tubes, a rotating driving wheel having a surface to frictionally engage and rotate the tubes, a cutter to which the tubes are successively presented, means for mounting the cutter whereby the edge thereof penetrates only the wall of the tube, and means for operating the cutter at substantially the same peripheral speed as the tubes.

6. The method of severing thin-wall tubes which consists in rotatably supporting each tube while bodily advancing the same into substantially simultaneous engagement with a rotating driving wheel and a thin cutting wheel rotating at substantially the same peripheral speed as that of the tube.

7. The method of severing thin-wall tubes which consists in rotatably supporting each tube while causing the same continuously to progress along a path which effects brief, substantially simultaneous engagement of the tube with a rotating driving wheel and a thin cutting wheel of smaller radius than the driving wheel and rotating at substantially the same peripheral speed as that of the driving wheel.

8. The method of severing thin-wall tubes which consists in advancing each tube into substantially simultaneous engagement with a rotating driving wheel and a thin cutting wheel, the tubes being advanced along a path which causes the cutting wheel barely to penetrate the wall of the tube at the point of closest approach.

9. A machine for severing thin-wall tubes comprising a thin rotating cutting wheel, a rotating driving wheel adapted to engage the periphery of each tube when presented to the cutting wheel to rotate the tube at high speed, and means for rotatably supporting and bodily advancing the tubes into substantially simultaneous engagement with the driving wheel and the cutting wheel.

10. A machine for severing thin-wall tubes comprising a thin rotating cutting wheel, a rotating driving wheel adapted to engage the periphery of each tube when presented to the cutting wheel to rotate the tube at high speed, and means for advancing the tubes into substantially simultaneous engagement with the driving wheel and cutter, said means having a plurality of devices to provide rotatable centerless support for the tubes.

11. A machine for severing thin-wall tubes comprising a thin cutting wheel, a rotating driving wheel of larger radius than the cutting wheel, means for advancing the tubes along a path which causes the tubes to be briefly engaged by the driving wheel and thereby rotated at high speed, and means for adjustably positioning the cutting wheel along a path substantially tangent to the driving wheel in the vicinity of the point of engagement of the driving wheel with the tubes.

WALTER B. CLIFFORD.